June 25, 1957     G. H. SCHWENK ET AL     2,796,675
COMPOSING BOARD
Filed Nov. 13, 1953     3 Sheets-Sheet 1

INVENTORS
GUSTAVE HERBERT SCHWENK
HOWARD G. SCHWARZ
BY Hudson, Boughton,
Williams, David & Hoffmann.
ATTORNEYS June 25, 1957 G. H. SCHWENK ET AL 2,796,675
COMPOSING BOARD
Filed Nov. 13, 1953 3 Sheets-Sheet 2

INVENTORS
GUSTAVE HERBERT SCHWENK
HOWARD G. SCHWARZ
BY Hudson, Boughton,
Williams, David & Hoffmann
ATTORNEYS June 25, 1957  G. H. SCHWENK ET AL  2,796,675
COMPOSING BOARD
Filed Nov. 13, 1953  3 Sheets-Sheet 3

INVENTORS
GUSTAVE HERBERT SCHWENK
HOWARD G. SCHWARZ
BY Hudson, Boughton,
Williams, David & Hoffmann.
ATTORNEYS United States Patent Office 2,796,675
Patented June 25, 1957

2,796,675
COMPOSING BOARD

Gustave Herbert Schwenk, Novelty, and Howard G. Schwarz, North Olmsted, Ohio, assignors to The Art Electrotype Company, Cleveland, Ohio, a corporation of Ohio Application November 13, 1953, Serial No. 392,005

15 Claims. (Cl. 33—184.5)

This invention relates to improvements in composing boards, that is to say apparatus for putting together in an orderly and systematic manner a number of articles accurately aligned in one direction or in two directions at right angles to each other, and in a method of accurately assembling and composing a group of such articles. The invention has utility in the making of a composite assembly of a series of individual like or similar articles. The particular application illustrated herein has to do with the formation of a composite electrotype mold from a series of individual molds in order to produce a composite electrotype from which relatively large sheets of labels or the like may be economically printed and a stack of such sheets afterwards cut into individual labels by a paper cutter of the guillotine type.

More especially the invention has to do with the formation of a plurality of electrotypes each of which is made from a plurality of individual molds for a given color of the same subject matter, the individual molds for each color being positioned by means of the composing board in identical arrangement with those for each of the other colors, whereby the composite electrotypes made from the individual molds for each color may be accurately registered in a printing press with a minimum amount of time for set-up.

One of the objects of the invention therefore is the provision of a composing board which may be used to assemble rapidly in accurate alignment or crossed alignment a considerable number of individual elements such as molds, planographic printing plates, electrotypes, photo-engravings, rubber printing plates, art work, etc.

Another object is the provision in a composing board of means for squaring up the individual elements that are to go into the composite article.

Another object is the provision of means for temporarily holding in place the individual elements as they are assembled and while they are being secured together.

Still another object is the provision of assembly means in accordance with which a second series of molds, printing plates or the like may be assembled in a composite form in precisely the same arrangement as the first series in order to provide means for printing a sheet in two or more colors in accurate register.

Other objects and features of novelty will appear as we proceed with the description of that embodiment of the invention which, for the purposes of the present application, we have illustrated in the accompanying drawings, in which.

Figure 8:
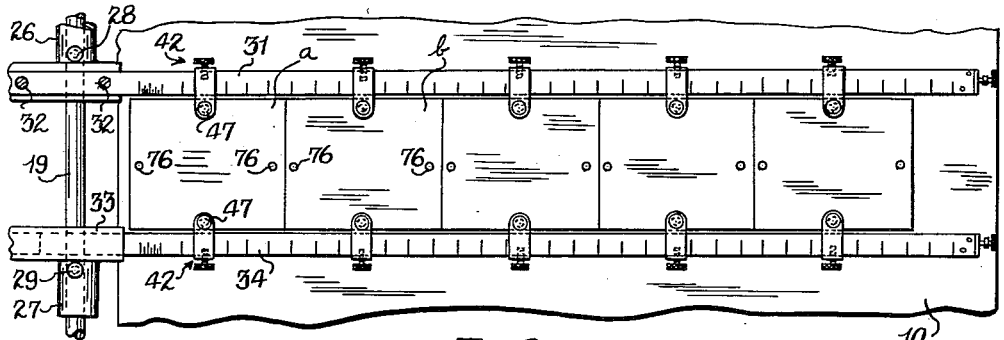
Figure 9:
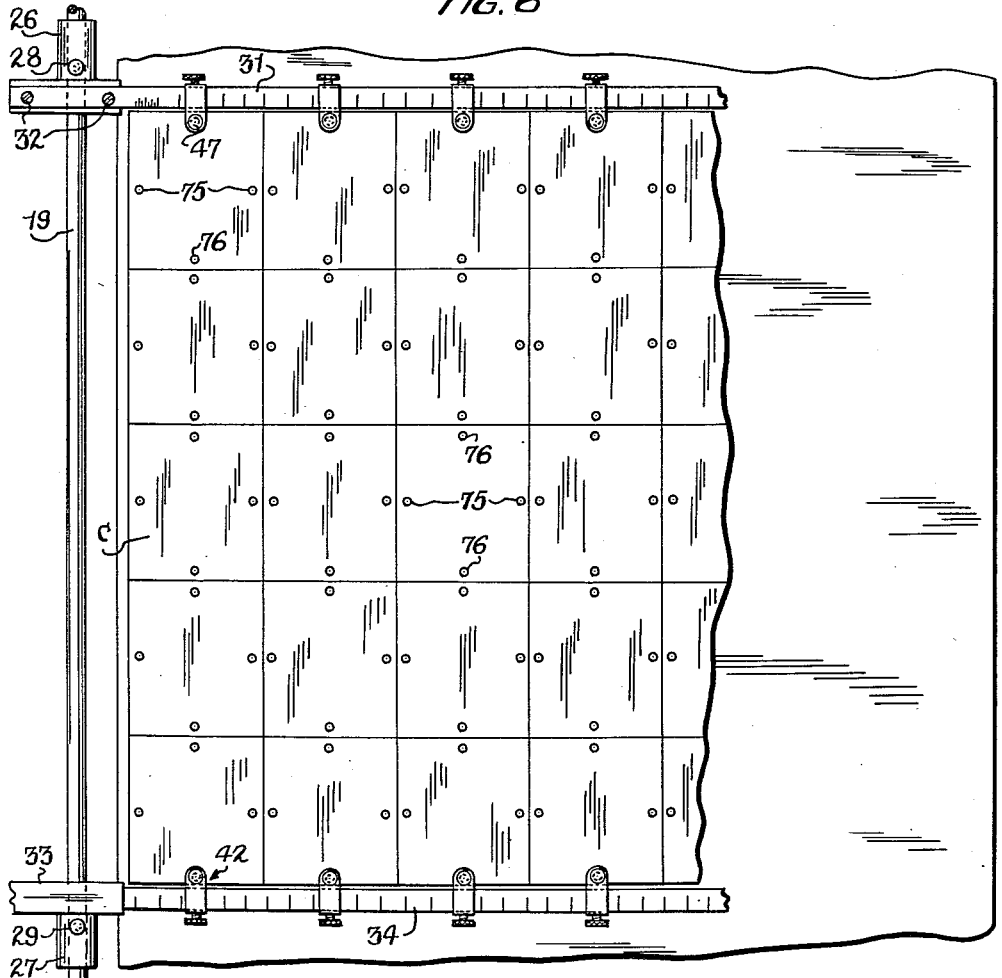

Fig. 8 is a fragmental plan view showing diagrammatically one step in the assembly of a series of like elements such as individual molds for electrotypes, and Fig. 9 is a diagrammatic plan view illustrating a second step in which a plurality of strips such as may be produced by the first step are assembled to form a composite mold in which the individual molds are cross aligned, that is aligned both horizontally and vertically.

Figure 10:
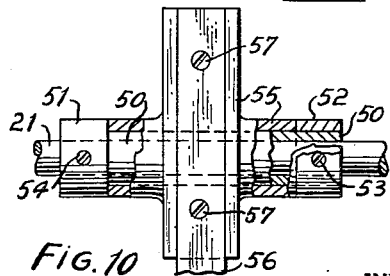

Fig. 10 is a detail plan view partly broken away and partly in section of the mounting of the squaring bar.

Figure 1:
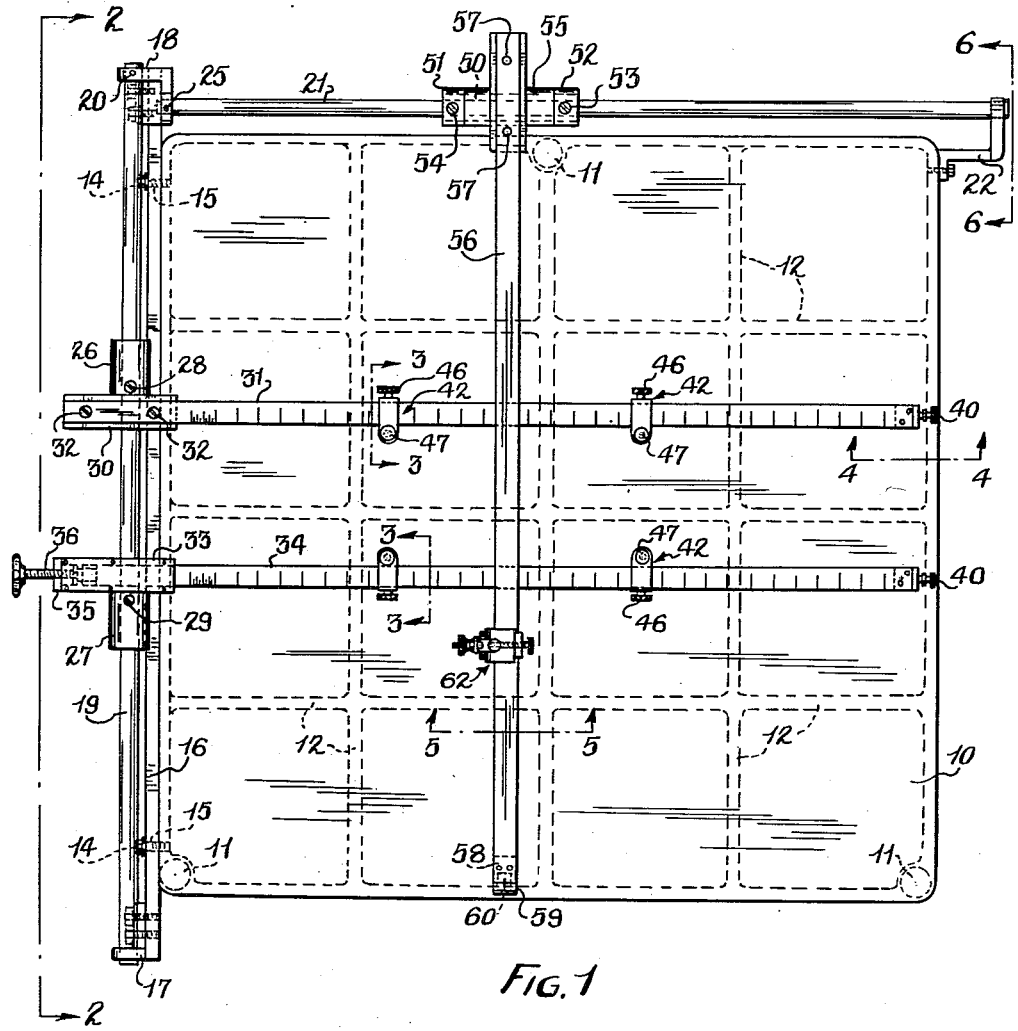
Fig. 1 is a plan view of a composing board built in accordance with our invention.
Figure 2:
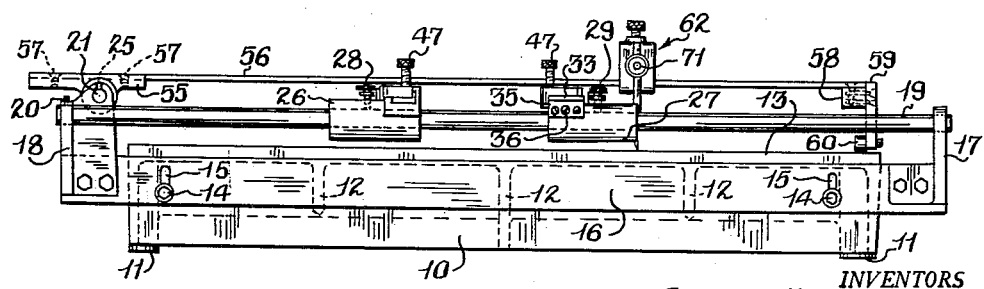
Fig. 2 is a side elevational view of the same looking in the direction of arrows 2 in Fig. 1.

In Fig. 1 we have shown a base 10 having three feet 11. Preferably the base is a casting having border flanges on its four sides and a plurality of reenforcing ribs 12 beneath the flat table portion 13. The base is therefore strong and rigid and relatively heavy.

Two or more bolts 14 are mounted in one of the side flanges of the base. These bolts extend through slots 15 formed in a rail 16 which is adjustable up and down by loosening bolts 14, moving the rail to the desired vertical position and again tightening the bolts. At one end of rail 16 there is a plain bracket 17 and at the other end an angle bracket 18. In end bracket 17 and in one arm of bracket 18 there is mounted a track 19, illustrated as a rod of round cross section. This rod may be held against movement by a setscrew 20 which is threaded into bracket 18. A second track 21, hereinafter sometimes called a top track, also of round cross section, is mounted at one end in the other arm of angle bracket 18 and at the other end in a bracket 22 which is adjustable up and down upon the base by means of a pair of bolts 23 extending through a slot 24 through a foot portion of the bracket into threaded holes in the base. By this means the track 21 may be maintained parallel to the table 13 throughout any adjustments of side rail 16. Movement of top track 21 in its mounting brackets is prevented by a setscrew 25.

Track 19 carries two brackets 26 and 27 which are slidable on the track and may be held in selected positions thereon by thumb screws 28 and 29 respectively. Bracket 26 has a channel groove 30 dimensioned to receive snugly a lateral bar 31 which bar is secured in position by a pair of screws 32. The upper surface of the bar is accurately marked with measuring scale divisions, partly indicated in the drawing.

Bracket 27 is similar to bracket 26, but its groove is covered by a plate 33 that is screwed to the bracket. A lateral bar 34 is slidably mounted in the groove of the bracket beneath plate 33. On the outer end of the bracket there is a plate 35 that is screwed to the bracket and is provided with a threaded opening to receive an adjusting screw 36 which has a rotatable connection with bar 34. Hence the turning of hand screw 36 will adjust bar 34 crosswise of the base.

Figure 4:
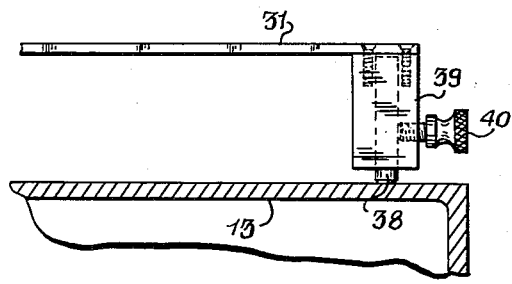

At their outer ends each of the bars 31 and 34 is provided with a foot 38, see Fig. 4, which rests on the base 10 in order to hold up the end of the bar and reduce friction when the bar is caused to move toward or away from the upper edge of the base. The foot 38 is made adjustable so that when the rail 16 is adjusted up or down, raising or lowering the left ends of the bars 31 and 34, a corresponding adjustment of the opposite ends thereof may be made. To this end we secure a block 39 to the under side of each bar, this block being bored to receive the shank of the foot 38 which is held in adjusted position by a thumb screw 40 threaded into the block in a position to engage the shank of the foot.

On each of the lateral bars 31 and 34 there may be mounted any desired number of slides 42, each of which comprises a body member 43 which rests upon the upper surface of bar 31 or 34. The body member includes a hook 44 to engage beneath one edge of the bar. Its other edge is engaged by a plate 45 that is supported upon a screw 46 which is threaded into body member 43.

Figure 7:
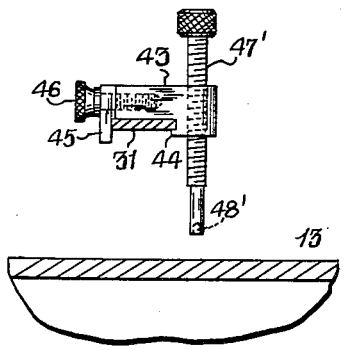
Fig. 7 is a detail view of a modification of Fig. 3.

When screw 46 is tightened the slide is clamped in a fixed position on the bar. A locater pin 47 is mounted for vertical adjustment in body member 43, the adjustment being effected by suitable means, as for example by a threaded connection. The lower end of this pin may be finished with a small axial projection 48. In the modification of Fig. 7 the locater pin which is marked 47' is provided with an axial recess 48'.

On the top track 21 there is slidably mounted a bushing 50 which has an integral collar 51 at one end. At its other end a separate collar 52 is mounted on the bushing and is secured thereto by a setscrew 53. The slidable bushing may be locked in any selected position upon track 21 by means of a setscrew 54 mounted in a threaded hole in collar 51 and adapted to engage the track.

Rotatably mounted on the bushing 50 there is a bracket 55 having a groove therein to receive snugly a bar 56 which we term a squaring bar, this bar being fixed to the bracket by screws 57 or the like. Collars 51 and 52 prevent movement of the bracket endwise of the bushing 50. To the free end of bar 56 there is attached a block 58 which carries a downwardly extending adjustable plate 59 upon the lower extremity of which there is rotatably mounted a wheel 60 that is adapted to run upon the surface of table 13 whenever the squaring bar 56 is caused to travel transversely across the base.

Figure 5:
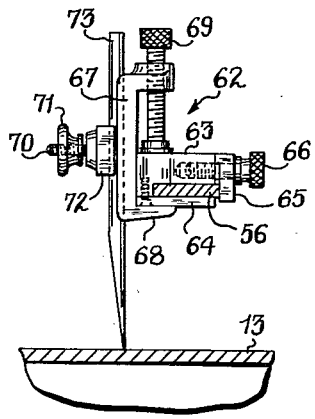
Figure 6:
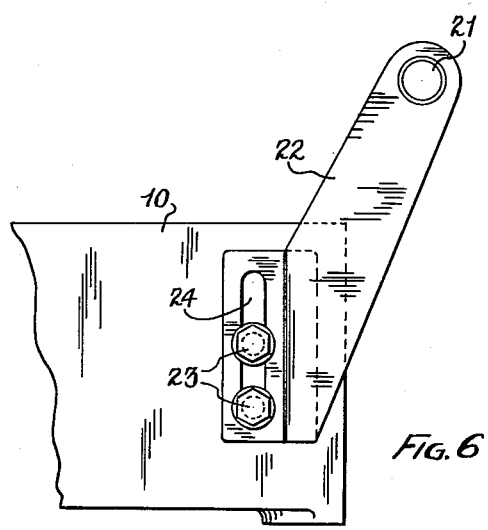

Squaring bar 56 is provided with a single scriber 62 which is shown in detail in Fig. 5. It comprises a body member 63 engaging the upper surface of bar 56 and one edge thereof. A plate 64 attached to the body member engages the under surface of the bar with sufficient clearance to permit the scriber to slide freely along the bar. The body member may be clamped in a selected position by a plate 65 supported upon a thumb screw 66 which is threaded into the body member and may be screwed in to force plate 65 into clamping position against the opposite edge of bar 56. A C-shaped clamping member 67 includes a foot 68 for engagement with plate 64 and a clamping screw 69 for engagement with the upper surface of body member 63, by means of which it is secured to the body member and moves with that member when the scriber is slid along the bar 56. Clamping member 67 carries a screw 70 on which is mounted a thumb nut 71 which is adapted to press against a clamping plate 72 that is provided with a vertical groove for clamping engagement with a scriber shaft 73 having an eccentrically disposed scribing point. A fine adjustment of the point may be effected by loosening the clamping plate 72, rotating the scriber shaft 73 and then again tightening the clamping plate 72.

While the method and apparatus herein disclosed are useful for composing individual pieces of various kinds, the operation will be described with particular reference to the making of a composite mold from a series of individual molds, especially molds formed of thermoplastic material such as vinyl acetate-vinyl chloride co-polymer.

Referring to Figs. 8 and 9 let it be assumed that it is desired to form a composite mold of individual molds of uniform size. In the making of these molds from a master form the form is provided with two drilled holes spaced apart in one direction and two others spaced apart in a direction at right angles to the first. When a mold is made on a master form provided with holes projections are formed on the mold. In the drawing it will be assumed that the markings are projections indicated at 75 and 76, the projections 75 being positioned along a more or less central line across the short dimension of the mold and the projections 76 being positioned along a more or less central line parallel to the long sides of the mold.

Now with the bracket 26 secured in place on the track 19 and the bracket 27 with its bar 34 positioned below where it is illustrated in Fig. 8, the operator places the first mold a on the table with one of the projections 75 adjacent bar 31. He next moves one of the slides 42 along bar 31 until the locater pin 47' stands approximately over the projection 75, and then moves the mold a into exact position beneath the pin 47', whereupon the pin is lowered into engagement with the projection. Now the operator moves bracket 27 up to the position illustrated and moves the first slide 42 on bar 34 until it comes approximately into position over the other projection 75 in the mold. The locater pin of this slide is then lowered until its axial recess 48' receives the projection. The mold a may or may not then be squared with the bars 31 and 34. Squaring can be accomplished by sliding bushing 50 along track 21 and sliding scriber 62 up until it overhangs the mold a. Then by sliding the scriber up and down along bar 56 along one edge of the mold or along an edge of the image thereon, any lack of squareness will be apparent. It can be overcome by turning adjusting screw 36 in one direction or the other, moving the entire bar 34 lengthwise in one direction or the other to the necessary extent. Thumb screw 29 on bracket 27 is then tightened to fasten the bracket in position and the two locater pins 47' previously engaged with the projections 75 in the mold are lowered further to cause the annular shoulders surrounding the recesses 48' on the locater pins to press the mold against the table and thus secure it in position at two points. The next slides 42 on the bars 31 and 34 are then spaced from the first slides a distance equal to the length of one mold and the locater pins 47' of this second pair of slides are raised far enough to permit a second mold to be positioned in place alongside the first, after which the pins 47' are turned down to engage the projections 75 of that mold. This procedure is repeated until the desired number of molds are aligned and secured in place. When this has been done adjacent molds are secured together by suitable means, as by heating the meeting edges until they flow together.

The various locator pins 47' are then retracted, leaving a strip of molds free to be withdrawn, or the two thumb screws 28 and 29 may be loosened and the brackets 26 and 27 swung up to raise the bars 31 and 34 out of the way when the strip can be removed from the table surface, the squaring bar 56 having been first swung up to clear the bars 31 and 34. The required number of additional strips are formed in the same manner except that the positions of the various slides 42 on the two bars 31 and 34 are not disturbed, the molds being merely placed with their projections 75 registering with the pins of the slides and the pins then lowered to lock the molds in place.

When the required number of strips have been formed they may be assembled upon the composing board as indicated in Fig. 9. A first strip c is placed upon the board and the upper projection 76 of the uppermost mold is brought into register with the locator pin 47' of the first slide on bar 31 and the pin lowered to cause its recess 48' to receive the projection on the mold. Next the lower lateral bar 34 is brought into position to enable the first slide 42 thereon to be disposed where its locator pin 47' may engage the lower projection 76 in the lowermost mold of the strip. Now the squaring bar 56 is moved laterally until the scriber 62 may be run up and down on the bar to determine when the strip is in correct position at right angles to track 21. For accomplishing this the bar 34 may be adjusted in bracket 27 by the means previously described. The other strips of molds may then be put in place one after another and secured to the bars 31 and 34 by the locator pins which are spaced apart on the bars a distance equal to the width of the molds so that the adjacent edges of the strips meet substantially. The meeting edges of adjacent strips are then secured together in the same manner as the individual molds were secured together. However, in some cases it may be desirable to lay a sheet of plastic material on the table as the first step in assembling the strips, the strips may be secured to this backing sheet by a procedure similar to spot welding, that is by holding an electrically heated needle against the mold to cause the plastic material thereof to adhere to the plastic backing.

Figure 3:
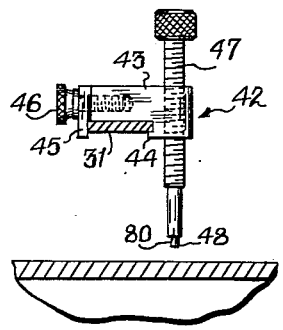
Figs. 3, 4, 5 and 6 are detail elevational views, partly in section upon the lines 3—3, 4—4, 5—5, 6—6 respectively of Fig. 1.

If the individual molds do not have properly squared edges, or if the image on the molds is not properly squared with the edges of the mold, the composing board may be employed to correct this fault, that is each mold may be mounted on the board held between locator pins on bars 31, 34, and scriber 62 run up and down to scribe the side edges of the mold, after which the scriber may be fixed upon the squaring bar and the bar traversed transversely on the track 21 to scribe the top or bottom edge of the mold. The scribed marks can then be followed for cutting the edges of the mold in accurately squared relation.

Where the master form, instead of having holes therein to form projections in the individual molds, has projections formed thereon, the individual molds will have holes. In such event the locator pin will be as shown in Fig. 3.

In some cases the pieces to be assembled may have substantial thickness. In that event the rail 16 will be adjusted upwardly to provide additional space for the tracks 19 and 21 above the level of the table 13, and the corresponding adjustment of bracket 22 will be effected. For some articles such as drawings, art work or photostats which have no substantial thickness, the markings on the pieces corresponding to the projections 75 and 76 of the described form of the invention may be merely pencil or ink marks. In such event the pin 47 may be a pin with a hardened needle point.

Also one pair of opposed markings on the molds or other articles may be sufficient in many cases. For example if the molds of Figs. 8 and 9 were provided with projections 75 only those projections could be registered with the locator pins 47′ in Fig. 9 by moving bar 31 down somewhat and bar 34 up somewhat and lining up the locator pins with those projections.

Where it is desired to make composite molds for electrotypes to be used in multicolor printing, molds for one color may be assembled and secured together as previously described, and the molds for the second color may be assembled and secured together in the same way, the precision possible with the method and apparatus here disclosed being such that registration of colors is assured.

In such case the slides 42 on each of the bars 31 and 34 should not be disturbed until each horizontal strip of molds for all colors has been assembled and the constituent molds in each strip fastened together. Then after the strip of molds of one color are mounted on the board and the locator pins connected with them as in Fig. 9 and the strips fastened together the slides 42 on the bars 31 and 34 should not be disturbed until the strips of all of the other colors are registered in like manner. The composite molds of all colors will then register throughout their extent and composite electrotypes produced therefrom may be exactly registered in a printing press.

An advantage of the invention is that the holes drilled in the master forms for the different colors need not be identically positioned with respect to the images thereon. The controlling factor is that the undisturbed locator pins will space apart the molds of the remaining colors the same distance. If it is necessary to make an adjustment of bar 34 by means of screw 36 in order that the bottom projections 75 in the molds of a succeeding color may be brought into register with the locator pins on that bar the result will not be adversely affected.

It will be obvious that the same procedure may be followed in forming a composite printing plate from a series of individual printing plates, where the individual plates for a given color have markings, that is holes or projections, identically arranged, and that multicolor composite plates capable of accurate registration may be formed in the same manner as the composite molds for electrotypes previously described.

Having thus described our invention, we claim:

1. In a composing board, a base, a guide track disposed along a side of said base, a top guide track disposed parallel to said base at right angles to said side track, a pair of brackets slidable upon said side track, lateral bars mounted in said brackets extending over the surface of said base parallel to said top track, locator pins adjustable along said lateral bars, a bracket slidable on said top track, a squaring bar carried by said last named bracket and a scriber slidably mounted on said squaring bar.

2. A composing board substantially as defined in claim 1, wherein one of said lateral bars is longitudinally adjustable in its bracket.

3. A composing board substantially as defined in claim 1, wherein said squaring bar is rotatable upon said top track in a plane at right angles to the length of said track.

4. A composing board substantially as defined in claim 1, wherein the bracket on said top track comprises a bushing with its axis parallel to the track and said squaring bar is rotatably mounted on said bushing, and means for releasably securing said bushing in adjusted position upon its track.

5. A composing board substantially as defined in claim 1, comprising a rail extending along one side of said base, means for mounting said rail on said base for adjustment in a direction normal to the surface of said base, means on the rail for rigidly supporting said side track, feet at the free ends of said lateral bars bearing on said base and adjustable toward and away from said base to maintain the bars parallel to the base for different adjustments of said rail.

6. A composing board substantially as defined in claim 1 comprising a rail extending along one side of said base, means for mounting said rail on said base for adjustment in a direction normal to the surface of the base, one end of said top track being mounted on said rail, and a bracket at the opposite side of said base in which the other end of said top track is mounted, said last named bracket being adjustable in a direction normal to the surface of the base to maintain the top track parallel to the base for different adjustments of said rail.

7. In a composing board, a base, a guide track disposed along a side of said base, a top guide track of circular cross section disposed parallel to the surface of said base at right angles to said side track, a pair of brackets slidable on said side track, lateral bars mounted in said brackets extending over the surface of said base parallel to said top track, locater pins adjustable along said bars, a bushing slidable on said top track having collars at its ends, a bracket rotatably mounted on said bushing between said collars, a squaring bar carried by said last named bracket, a scriber slidably mounted on said squaring bar, and means for holding said bushing in adjusted positions.

8. A composing board substantially as defined in claim 1, wherein the adjustment of said locater pins along said lateral bars comprises in each instance a slide movable lengthwise on the bar, and means for securing the slide in adjusted position, and wherein each locater pin is movable up and down in said slide perpendicular to the surface of said base, and wherein each locater pin has a clamping surface adapted to press the work against the base of the composing board.

9. A composing board substantially as defined in claim 1, comprising means for locking said scriber in a selected position on said squaring bar, whereby an article on said base may be scribed in one direction by moving the scriber along the bar, and whereby it may be scribed in a direction normal to the first by locking the scriber on the bar at a selected point and traversing the bracket along the top track.

10. In a composing board for assembling without overlapping groups of similarly shaped and dimensioned articles, a base, a guide track disposed along a side of said base, two brackets slidable upon said track, lateral bars mounted in said brackets extending over the surface of said base at right angles to said track, slides adjustable along said lateral bars, and a locater pin carried by each of said slides, each of said pins being movable in its slide for adjustment toward and away from said base, and having a clamping surface adapted to press the work against the said base.

11. A composing board substantially as defined in claim 11, comprising screw means for adjusting one of said lateral bars lengthwise in its bracket.

12. The method of making a composite assembly of a series of individual printing elements having thereon images of like dimensions, which comprises placing on each element two spaced apart markings, the markings on each element being positioned identically with those of every other element, supporting a series of locater pins aligned and evenly spaced above a supporting surface, disposing said elements on said surface with one of said markings on each element beneah and registered with one of said locater pins, squaring said elements to bring said images into orderly and accurate relation to each other, supporting above said supporting surface, a second set of locater pins spaced like the pins of said first set and bringing said last named pins into register with the remaining marking of each element, causing all of said pins to engage said elements at the corresponding markings and secure them against said supporting surface, and fastening said elements together while so held by said locater pins.

13. The method of assembling printing elements as defined in claim 12, wherein said locater pins are first lowered to engage the markings of said elements and then forced down further to exert pressure on the elements surrounding said markings.

14. In combination, a composing board having a base, a plurality of printing elements to be formed into a composite assembly upon said base, a guide track disposed along a side of said base, a pair of brackets slidable upon said track, lateral bars mounted in said brackets extending over the surface of said base parallel to each other, and locater pins adjustable along each of said lateral bars, said elements and said pins having complementary projections and recesses adapted to engage each other for positioning the elements upon the base, and each of said pins having a clamping surface concentric with the axis of the pin adapted to press one of said plates against said base, whereby said elements may be held in position side by side lengthwise of said bars and while so held may be secured together before the assembly is removed from said board.

15. In a composing board, a base, a guide track disposed along a side of said base for supporting a pair of brackets slidable upon said track and adapted to be held in selected position thereupon against movement lengthwise of the track, lateral bars mounted in said brackets extending over the surface of said base at right angles to said track, locater pins adjustable along said lateral bars adapted to be secured in selected positions thereupon, one of said bars being fixed in its bracket and the other bar being longitudinally adjustable in its bracket, whereby the pins on the latter bar may be moved collectively with respect to the pins on the first bar.

References Cited in the file of this patent

UNITED STATES PATENTS

| 983,648 | Royle | Feb. 7, 1911 |
| 1,182,487 | Huebner | May 9, 1916 |
| 1,387,802 | Novotny | Aug. 16, 1921 |
| 1,538,908 | Schultz | May 26, 1925 |
| 2,621,411 | Christen | Dec. 16, 1952 |